(No Model.)
A. E. CHAMBERS, Jr.
HALTER.
No. 477,644.        Patented June 28, 1892.
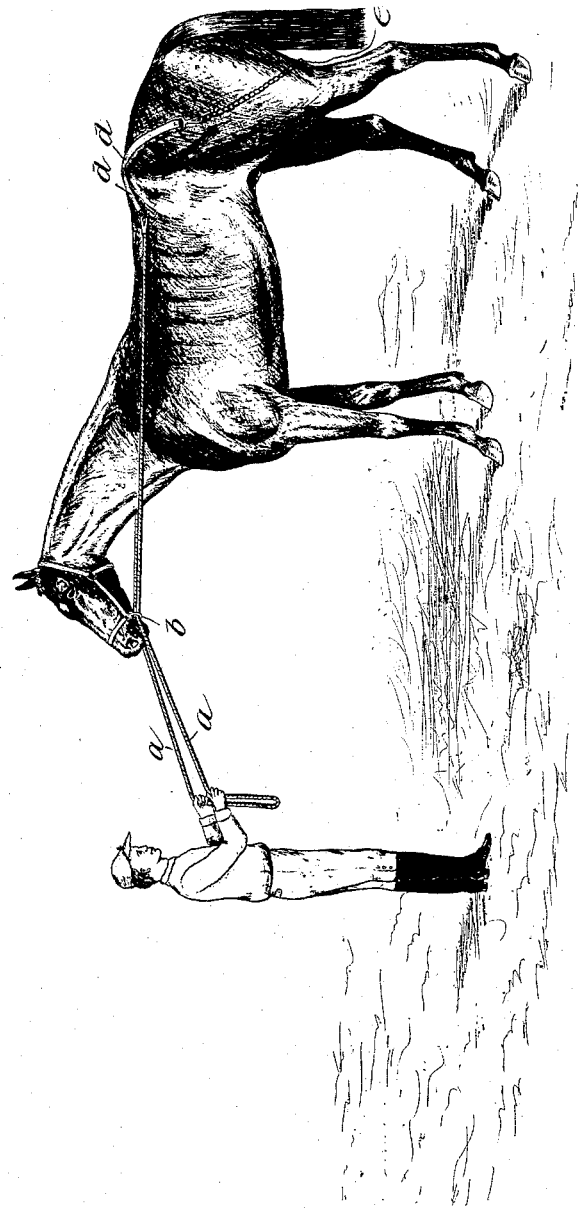
Witnesses
Edwin L. Bradford
Frank W. Thatcher
Inventor
Alfred E. Chambers Jr.
By Patrick O'Farrell.
Attorney

UNITED STATES PATENT OFFICE.

ALFRED E. CHAMBERS, JR., OF PETERSBURG, KENTUCKY.

HALTER.

SPECIFICATION forming part of Letters Patent No. 477,644, dated June 28, 1892.

Application filed April 6, 1892. Serial No. 428,059. (No model.)

*To all whom it may concern:*

Be it known that I, ALFRED E. CHAMBERS, Jr., a citizen of the United States of America, residing at Petersburg, in the county of Boone and State of Kentucky, have invented certain new and useful Improvements in Halters for Horses, of which the following is a specification, reference being had therein to the accompanying drawing.

My invention relates to halters for horses.

The object of my invention is to provide a halter for training young horses to lead.

The accompanying drawing illustrates one of my improved halters as applied to a horse, in which $a$ indicates a rope passing through rings $b$ of an ordinary headstall and extending along on each side of the horse's back to near the loins, where the ends are attached to the cross-straps $d\ d$ by suitable fastenings. To the opposite end of these cross-straps are attached the ends of a chain $e$, which is in this way suspended underneath the horse's buttock. The novelty of this halter consists in passing the rope $a$ freely through the rings $b$ and connecting it with the cross-strap $d$ and providing a strap or preferably a chain to extend down under the horse's buttock. It will be observed that this construction enables the person leading the animal to guide him and that any resistance to being led will cause the chain $e$ to press on his buttock with the same force that is exerted to keep his head down when he attempts to rear up, and this has been found to effectually prevent the most unmanageable colts from backing and rearing up when being taught to lead.

The part $e$ is preferably a chain instead of a cord, as in that case its weight keeps it down in proper position.

Having thus described my invention, what I claim as new, and desire to secure by Letters Patent, is—

A halter for horses, consisting of a suitable headstall, and a strap or rope $a$, passing through rings $b$ of said headstall, and a chain $e$ for extending under the buttock of the horse, and cross-straps $d\ d$ for connecting the ends of strap or rope $a$ with the ends of the chain $e$, substantially as described.

In testimony whereof I affix my signature in presence of two witnesses.

A. E. CHAMBERS, JR.

Witnesses:
W. T. CRISLEN,
B. P. RICE.